(12) United States Patent
Harding

(10) Patent No.: US 9,158,029 B2
(45) Date of Patent: Oct. 13, 2015

(54) MULTI-STAGE SECURITY SCREENING SYSTEM AND SMART COMMUNICATION SYSTEM

(71) Applicant: Morpho Detection, Inc., Newark, CA (US)

(72) Inventor: Geoffrey Harding, Hamburg (DE)

(73) Assignee: MORPHO DETECTION, LLC, Newark, CA (US)

( * ) Notice: Subject to any disclaimer, the term of this patent is extended or adjusted under 35 U.S.C. 154(b) by 216 days.

(21) Appl. No.: 13/918,398

(22) Filed: Jun. 14, 2013

(65) Prior Publication Data

US 2014/0369468 A1  Dec. 18, 2014

(51) Int. Cl.
G01N 23/04 (2006.01)
G01V 5/00 (2006.01)

(52) U.S. Cl.
CPC ............ *G01V 5/0033* (2013.01); *G01V 5/0025* (2013.01)

(58) Field of Classification Search
CPC .... G01N 23/04; G01V 5/0025; G01V 5/0033
USPC .......................................................... 378/57
See application file for complete search history.

(56) References Cited

U.S. PATENT DOCUMENTS

| 5,796,802 A | 8/1998 | Gordon |
| 7,660,457 B2 | 2/2010 | Schmiegel et al. |
| 2005/0058242 A1 | 3/2005 | Peschmann |
| 2005/0117700 A1 | 6/2005 | Peschmann |
| 2009/0016487 A1 * | 1/2009 | Strecker et al. ................. 378/57 |

FOREIGN PATENT DOCUMENTS

| DE | 102004031130 A1 | 1/2006 |
| EP | 0825457 A2 | 2/1998 |
| EP | 1526392 A2 | 4/2005 |
| EP | 1918738 A2 | 5/2008 |

OTHER PUBLICATIONS

Hsieh, et al., Recent Advances in CT Image Reconstruction, Current Radiology Reports, Mar. 2013, vol. 1, Issue 1, pp. 39-51, DOI 10.1007/s40134-012-0003-7, Advances in CT Imaging (NJ PELC, Section Editor), published online, https://engineering.purdue.edu/~bouman/publications/orig-pdf/CRR-2013.pdf.

An Extended European Search Report, dated Aug. 22, 2014, for co-pending EP patent application No. EP 14002000.9 (9 pgs).

(Continued)

*Primary Examiner* — Courtney Thomas
(74) *Attorney, Agent, or Firm* — Armstrong Teasdale LLP

(57) ABSTRACT

A multi-stage screening system for screening a container includes a pre-screening stage including a transmission X-ray device. The pre-screening stage is configured to generate constraint data associated with the contents of the container. The system also includes a screening stage including an X-ray diffraction imaging (XDI) device. The screening stage is configured to generate image data associated with the contents of the container. The system further includes a communication system coupled to the pre-screening stage and the screening stage. The communication system is configured to receive and transmit the constraint data and reconstruct at least one image of the container at least partially as a function of the constraint data and the image data.

16 Claims, 4 Drawing Sheets

(56) References Cited

OTHER PUBLICATIONS

Chen, K. et al., "A Regularized Iterative Reconstruction Algorithm for X-Ray Diffraction Tomography," Next-Generation Spectroscopic Technoligies V, Proc. of SPIE, vol. 8374, No. 1, May 11, 2012, Bellingham, WA (pp. 1-11).

Harding, G., "X-ray diffraction imaging—A multi-generational perspective," Applied Radiation and Isotopes, Elsevier, Oxford, GB, vol. 67, No. 2, Feb. 1, 2009 (pp. 287-295).

* cited by examiner

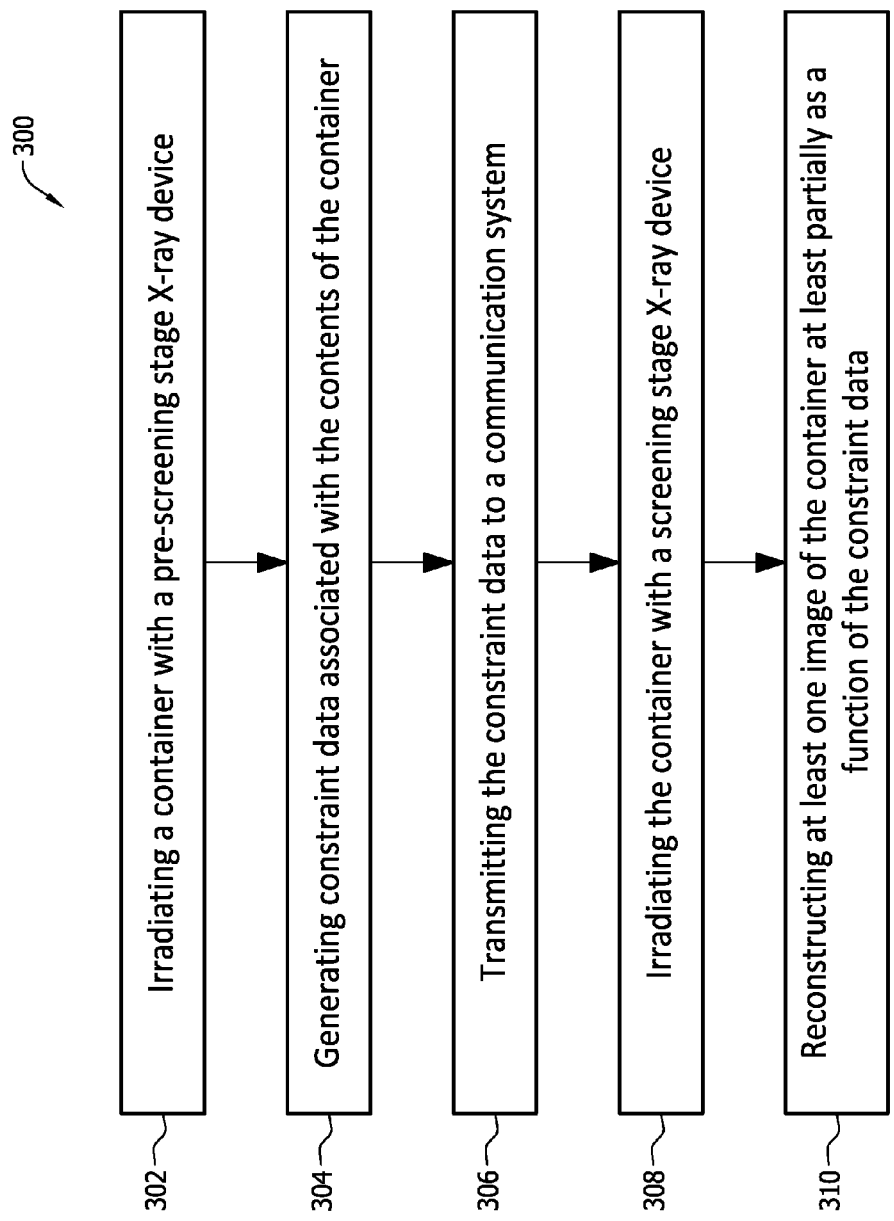

MULTI-STAGE SECURITY SCREENING SYSTEM AND SMART COMMUNICATION SYSTEM

BACKGROUND OF THE INVENTION

The embodiments described herein relate generally to a security screening system and, more particularly, to a multi-stage security screening system with a smart communication system between the stages.

Many known security systems for screening containers for materials and item of interest include a two-stage screening system. As used herein, the terms "materials of interest" and "items of interest" refer to contraband substances such as, without limitation, explosives, narcotics, and weapons that may compose a threat in an inspected region of the containers. Also, as used herein, the term "containers" refers to, without limitation, luggage, shipping packages and parcels, bags, cargo, and vehicles.

The first stage is typically a pre-screening stage that uses X-ray devices such as a transmission pre-screener, e.g., single-view devices, advanced technology multi-view devices, and computed tomography (CT) systems. Such pre-screening is typically performed at cabin baggage screening (CBS) checkpoints and/or hold baggage screening (HBS) checkpoints. Also, while such pre-screening devices facilitate determining a density of the objects in the container, including relative densities of such objects, and the approximate coordinates of the objects within the container using the spatial resolution properties of such pre-screening devices, they are not molecular-specific. Therefore, a second stage is typically used downstream of the pre-screening stage. The second stage is a screening stage that uses X-ray diffraction imaging (XDI) devices to resolve alarms raised by the x-ray pre-screener. The molecular-specific detection performance of the XDI device enables it to accurately resolve alarms raised by the transmission pre-screener. Such XDI devices generate a diffraction profile of each substance irradiated with X-rays. Because such materials typically have a known and discernible X-ray diffraction (XRD) signature, detection and identification of contraband items and substances is facilitated.

Such pre-screening stage transmission X-ray systems have a tendency to increase the false alarm rate (FAR). Also, such pre-screening stages transfer only approximate threat coordinates and the nature of the supposed threat via a simple communication stage to the subsequent XDI scanner. Therefore, the irradiating power of the X-ray scan by the XDI device must be increased and the scan period extended to accurately resolve the alarms. Such increases in the scan period and power usage increase the costs of screening. Also, since the communications between the pre-screening stage and the XDI scanner are one-way only, there is no feedback mechanism to calibrate the pre-screening stage to improve alarm accuracy and decrease the FAR.

BRIEF DESCRIPTION OF THE INVENTION

In one aspect, a multi-stage screening system for screening a container is provided. The system includes a pre-screening stage including a transmission X-ray device. The pre-screening stage is configured to generate constraint data associated with the contents of the container. The system also includes a screening stage including an X-ray diffraction imaging (XDI) device. The screening stage is configured to generate image data associated with the contents of the container. The system further includes a communication system coupled to the pre-screening stage and the screening stage. The communication system is configured to receive and transmit the constraint data and reconstruct at least one image of the container at least partially as a function of the constraint data and the image data.

In another aspect, a method of performing a security screen of a container is provided. The method includes irradiating a container with a pre-screening stage X-ray device and generating constraint data associated with the contents of the container. The method also includes transmitting the constraint data to a communication system and irradiating the container with a screening stage X-ray device. The method further includes reconstructing at least one image of the container at least partially as a function of the constraint data.

BRIEF DESCRIPTION OF THE DRAWINGS

FIGS. 1-4 show exemplary embodiments of the systems and methods described herein.

FIG. 1 is a schematic block diagram of an exemplary prior art two-stage screening system;

FIG. 2 is a schematic block diagram of an exemplary two-stage screening system with an exemplary communication system between the two stages;

FIG. 3 is a schematic block diagram of the communication system shown in FIG. 2; and FIG. 4 is a flow chart of an exemplary method of operating the two-stage screening system shown in FIGS. 2 and 3.

DETAILED DESCRIPTION OF THE INVENTION

The multi-stage security screening system with a smart communication system between the stages described herein facilitates cost-effective enhanced integration of a pre-screener image and an X-ray diffraction imaging (XDI) scanner, thus enhancing overall performance of a security scanning system. Specifically, in contrast to many known security scanning systems, the multi-stage security screening system with a smart communication system as described herein facilitates exceeding mere transferring of only threat coordinates and the nature of a supposed threat via a simple communication stage to a subsequent XDI scanner. More specifically, the systems described herein collect potential threat information from a pre-screener stage and transmit such information to a "smart" communication stage prior to transmission to an XDI scanner stage. The "smart" communication stage as described herein executes tasks that include, in addition to transferring container coordinates and supposed nature of a potential threat, also constraining XDI images using pre-screener images to improve spatial resolution within the container and reducing noise, aiding aggregation of voxels belonging to the same object in the container under investigation, and adapting the operating parameters of the XDI scanner in real-time as a function of the potential threats. Therefore, threat detection is enhanced at a constant X-ray source flux, thereby maintaining a constant X-ray dose rate and power consumption. Also, intelligently using information through the "smart" communication stage to make a threat/no threat decision on the basis of both pre-screener information and XDI information to resolve alarms raised by the pre-screener facilitates decreasing the false alarm rate (FAR) regardless of the frequency or rate of detection.

Figure 1:
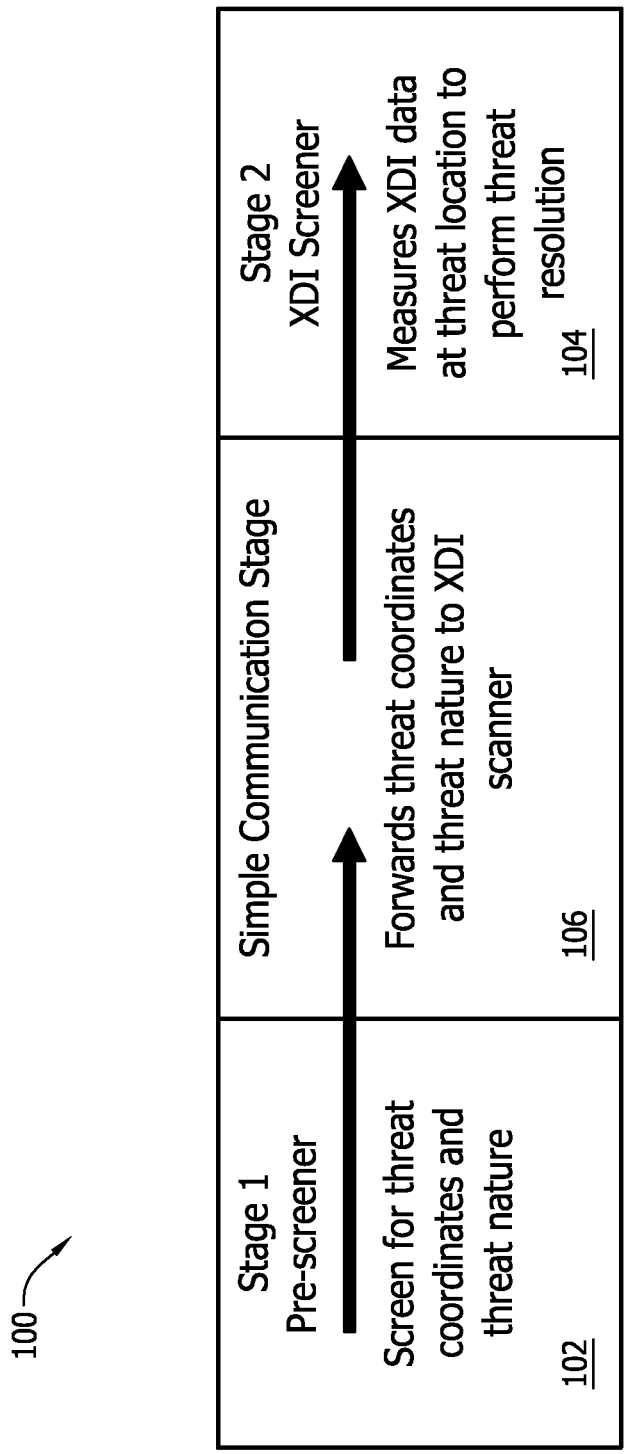

FIG. 1 is a schematic block diagram of an exemplary prior art two-stage screening system 100. System 100 includes an X-ray pre-screener 102 that may be either of a single-energy type or a dual-energy type. System 100 also includes an XDI screener 104 downstream of X-ray pre-screener 102 with a simple communications stage 106 therebetween. X-ray pre-screener 102 is a first, pre-screening stage that uses X-ray devices such as a transmission pre-screener, e.g., single-view devices, advanced technology multi-view devices, and computed tomography (CT) systems (neither shown). Such pre-screening is typically performed at cabin baggage screening (CBS) checkpoints and/or hold baggage screening (HBS) checkpoints (neither shown). Such X-ray pre-screeners 102 facilitate determining a density of the objects in a container (neither shown), including relative densities of such objects, and the approximate coordinates of the objects within the container using the spatial resolution properties of such pre-screening devices.

However, X-ray pre-screener 102 is not molecular-specific. Therefore, a second stage, i.e., XDI screener 104 is used downstream of pre-screening stage 102. The second stage is a screening stage that uses XDI devices (not shown) to resolve alerts/alarms raised by X-ray pre-screener 102. Specifically, X-ray pre-screener 102 transfers coordinates representative of a location of potential threat in a container and the supposed nature of the threat via simple communication stage 106 to XDI screener 104. Owing to its enhanced detection performance, i.e., the molecular-specific detection performance, XDI screener 104 accurately resolves alerts/alarms raised by X-ray pre-screener 102. XDI screener 104 generates a diffraction profile of each substance irradiated with X-rays. Such materials typically have a known and discernible X-ray diffraction (XRD) signature. Therefore detection and identification of contraband items and substances is facilitated.

In operation, data from XDI screener 104 is mirrored onto a four-dimensional (4D) object matrix (not shown) using a processing device (not shown). This matrix initially defines three spatial dimensions, i.e., a position defined by a height dimension, a breadth dimension, and a length dimension of object voxels (not shown) that define a three-dimensional (3D) representation of the container. Additionally, each voxel has a fourth, i.e., a momentum dimension, defined through the momentum transfer parameter:

$$x = \sin(\theta/2)/\lambda, \quad \text{Equation (1)}$$

where θ is the angle of scatter and λ is the photon wavelength. The momentum dimension represents the X-ray coherent scatter characteristics of the material in that voxel. Mirroring detector data onto the 4D object voxel leads to a "zeroth ($0^{th}$) order" estimate of the container contents. As used herein, the terms "$0^{th}$ order approximation" and "$0^{th}$ order estimate" represent a first approximation of the nature of the contents of the voxels derived from a plurality of simplifying assumptions.

Figure 2:
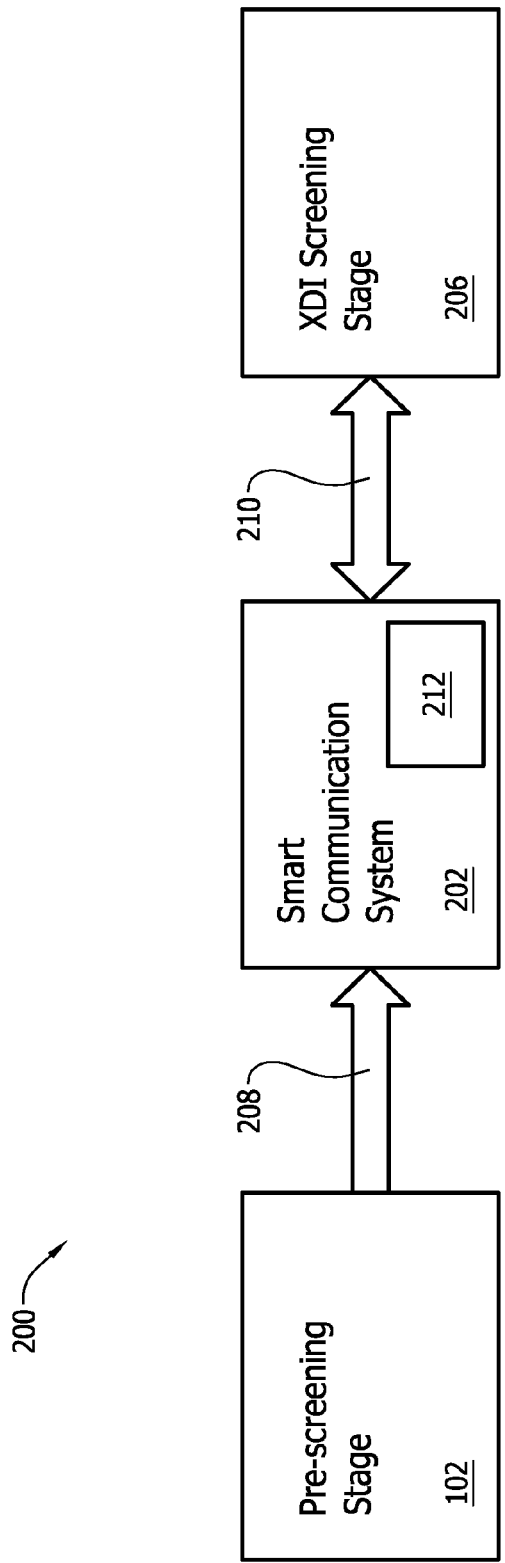

FIG. 2 is a schematic block diagram of an exemplary two-stage screening system 200 with an exemplary communication system 202 between the two stages. In the exemplary embodiment, system 200 includes a first stage, i.e., a pre-screening stage 204 that is similar to X-ray pre-screener 102 (shown in FIG. 1). As such, pre-screening stage 204 includes at least one X-ray pre-screening device (not shown) that may be either of a single-energy type or a dual-energy type. Moreover, pre-screening stage 204 may include any device and/or system that enables operation of system 200 and pre-screening stage 204 as described herein, including, without limitation, a transmission pre-screener, e.g., a single-view device, an advanced technology multi-view device, and a computed tomography (CT) system. Such pre-screening is typically performed at cabin baggage screening (CBS) checkpoints and/or hold baggage screening (HBS) checkpoints (neither shown). Also, pre-screening stage 204 facilitates determining a density of the objects in a container (neither shown), including relative densities of such objects, and the approximate coordinates of the objects within the container using the spatial resolution properties of such pre-screening devices. As described further below, generating such data facilitates pre-screening stage 204 generating constraint data associated with the contents of the container.

Two-stage screening system 200 also includes a second stage, i.e., an XDI screening stage 206 downstream of pre-screening stage 204. XDI screening stage 206 is similar to XDI screener 104 (shown in FIG. 1) that uses XDI devices (not shown) to resolve alerts/alarms raised by pre-screening stage 204. The enhanced detection performance, i.e., the molecular-specific detection performance, of XDI screening stage 206 generates a diffraction profile of each substance irradiated with X-rays. XDI screening stage 206 is configured to receive constraint data from pre-screening stage 204 and reconstruct at least one image of the container under scrutiny at least partially as a function of the constraint data (discussed further below). The detection performance, i.e., the molecular-specific detection performance, of XDI screening stage 206 is further enhanced. XDI screening stage 206 generates a diffraction profile of each substance irradiated with X-rays. Such materials typically have a known and discernible X-ray diffraction (XRD) signature. Therefore detection and identification of contraband items and substances is facilitated. Constraining the operation of XDI screening stage 206 enhances the accuracy, timeliness, and costs of such detection and identification as discussed further below.

Two-stage screening system 200 further includes smart communication system 202 coupled to pre-screening stage 204 and XDI screening stage 206. Smart communication system 202 is configured to receive information from pre-screening stage 202 as shown by arrow 208 in a manner similar to X-ray pre-screener 102 and simple communication stage 106 (both shown in FIG. 1). However, in contrast to the relationship between simple communication stage 106 and XDI screener 104 (both shown in FIG. 1) that only share one way communication from simple communication stage 106 to XDI screener 104, smart communication system 202 and XDI screening stage 206 share two-way communications as shown by arrow 210.

Figure 3:
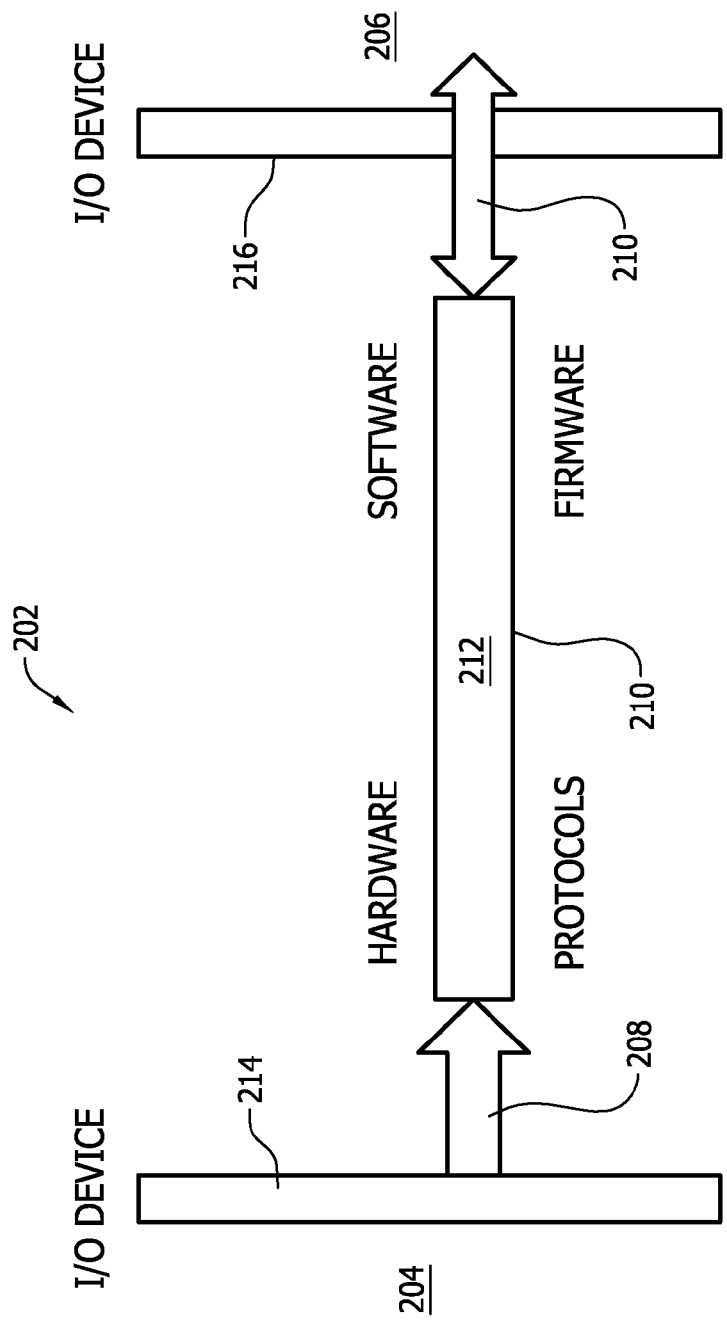

FIG. 3 is a schematic block diagram of smart communication system 202. Smart communication system 202 includes at least one processing device 212. In some embodiments, processing device 212 may include devices in one or both of pre-screening stage 204 and XDI screening stage 206. In the exemplary embodiment, processing device 212 is coupled to pre-screening stage 204 through a first input/output (I/O) device 214 and is coupled to XDI screening stage 206 through a second I/O device 216. Processing device 212, and the remaining portions of smart communication system 202, include the necessary hardware, software, firmware, and communications protocols to enable operation of smart communication system 202 and two-stage screening system 200 as described herein.

As used herein, the terms "processor" and "processing device" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processing device 212 and other processors (not shown) as described herein process information transmitted from a plurality of electrical and electronic devices that include, without limitation, pre-screening stage 204 and XDI screening stage 206. Memory devices (not shown) and storage devices (not shown) store and transfer information and instructions to be executed by processing device 212. Such memory devices and storage devices can also be used to store and provide temporary variables, static (i.e., non-volatile and non-changing) information and instructions, or other intermediate information to processing device 212 during execution of instructions by processing device 212. Instructions that are executed include, but are not limited to, analysis of signals transmitted from pre-screening stage 204 and XDI screening stage 206. The execution of sequences of instructions is not limited to any specific combination of hardware circuitry and software instructions.

Referring to FIGS. 2 and 3, pre-screening stage 204 generates constraint data associated with the contents of the container under consideration and transmits the constraint data to smart communication system 202, i.e., processing device 212 (as shown by arrow 208). XDI screening stage 206 is configured to receive constraint data from pre-screening stage 204 through smart communication system 202 (as shown by arrow 210) and reconstruct at least one image of the container under scrutiny at least partially as a function of the constraint data. Such constraint data may include an aggregated plurality of voxels, thereby constraining the at least one object with respect to at least one of object shape and coordinates of position within the container.

Pre-screening stage 204 generates images having enhanced spatial resolution as compared to images generated by XDI screening stage 206. Therefore, images generated by pre-screening stage 204 provide useful information for constraining the shapes and positions of object surfaces within the container under scrutiny. This information, combined with image data generated by XDI screening stage 206, significantly improves the identification of those voxels belonging to one and the same object, thus also further enhancing detection performance. The image data generated by pre-screening stage 204 is transmitted to smart communication system 202, i.e., processing device 212 (as shown by arrow 208).

As described above for XDI screener 104, image data from XDI screening stage 206 is mirrored onto a four-dimensional (4D) object matrix (not shown) using processing device 212 (as shown by arrow 210). Mirroring detector data onto the 4D object voxel leads to a $0^{th}$ order approximation of the contents in the container. Improvements in the $0^{th}$ order approximation may be achieved with an iterative reconstruction technique within processing device 212.

Iterative XDI reconstruction is a tool for improving both spatial resolution and decreasing noise in XDI images. Such iterative XDI reconstruction facilitates "forward modeling" in processing device 212 whereby a container, interrogated by an x-ray beam, generates a set of XDI detector signals (not shown). Given a certain initially assumed container, such as the $0^{th}$ order approximation generated by XDI screening stage 206, the forward model predicts values of the XDI detector signals. These computed signals are then compared with the detector signals actually generated as a result of a scan, i.e., actual scan signals.

A set of difference signals, defined as the actual scan signals minus the computed signals, is computed. This set of difference signals is "back-projected" in an inverse computation onto the 4D object voxel matrix to correct the $0^{th}$ order approximation. This process of forward computation, estimation of differences, and back-projection is used iteratively to improve both the spatial resolution and noise properties of the images.

The iterative reconstruction techniques as described herein include using the a priori information described above in the reconstruction. Such a priori information is provided naturally in the images that pre-screening stage 204 captures of the container. For example, images generated by pre-screening stage 204 may reveal in which object regions the container is particularly dense, or particularly transparent. These pre-screening images are communicated to processing device 212 through first I/O device 214 and smart communication system 202 to an iterative reconstruction algorithm programmed in processing device 212 in the form of constraints. For example, it is not physically reasonable that the XDI voxels along a certain primary beam ray path from the X-ray source should be densely populated when the pre-screener data suggests that the container is more or less transparent along the same ray path. Therefore, pre-screening stage 204 generates transparency constraint data in the form of a transparency determination of the container as a result of a scan by pre-screening stage 204. Such transparency constraint data is transmitted to smart communication system 202 (as shown by arrow 208).

Using the iterative reconstruction features as describe above, processing device 212 generates a computational model of the container's X-ray properties that optimally satisfies both the pre-screener and the XDI image data. The overall effect of incorporating pre-screener data into the iterative XDI reconstruction procedure is to improve detection performance, by improving the spatial resolution and reducing the noise of the reconstructed XDI image.

The iterative XDI reconstruction as described above is further facilitated by voxel aggregation. On completion of the XDI scan procedure, the iterative XDI reconstruction module delivers a 4D voxel map of the x-ray properties of the container under investigation. In order to reduce XDI image noise, voxels belonging to the same object, e.g., without limitation, bottles, bags, and boxes in the container are aggregated. This step increases the signal-to-noise ratio of the total XRD profile summed over aggregated voxels when the contents of the object defining those voxels are homogenous. There are numerous algorithms that may be used for aggregating voxels belonging to the same object including, without limitation, segmentation and cross-correlation. Therefore, in the exemplary embodiment, at least some of the constraint data includes an aggregated plurality of voxels, thereby constraining the at least one object with respect to at least one of object shape and the coordinates of the object's position within the container.

Further, in the exemplary embodiment, at least some of the constraint data includes attenuation properties of the objects in the container, thereby at least partially defining potential threats as a function of such attenuation properties. As described herein, pre-screening stage 204 images containers before they reach XDI screening stage 206. Although pre-screening stage 204 has limited detection capabilities, it is able to measure the local attenuation properties of the containers and to at least indicate via density and mean atomic number whether an object, e.g., without limitation, a bottle in the container contains fuel, water, or an oxidizer, such as hydrogen peroxide.

Thus, when pre-screening stage 204 transfers threat coordinates and supposed threat nature to smart communication system 202, additional information is present on the nature of the supposed threat (e.g., fuel or oxidizer). As such, smart communication system 202 facilitates iterative XDI reconstruction using "a priori" pre-screener information and the associated constraints, reconstructing XDI data through voxel aggregation and object attenuation properties to identify potential threat "objects" and their coordinates in the container rather than merely apparent threat voxels.

Moreover, in the exemplary embodiment, multi-stage screening system 200, through smart communication system 202, is further configured to regulate irradiation of containers by XDI screening stage 206 at least partially as a function of potential threats as determined by the images and constraint data transmitted from pre-screening stage 204.

In general, hydrocarbon fuels have their principal Bragg peaks at relatively low momentum, i.e., approximately 1 $nm^{-1}$. If pre-screening stage 204 indicates that a bottle contains a fuel such as acetone, a higher, more accurate XDI signal can be acquired by lowering the X-ray tube voltage potential at constant power, thus increasing the X-ray tube current. A lower X-ray tube potential places the higher end of the associated bremsstrahlung, or braking radiation, emission spectrum closer to the fuel Bragg peak. Conversely, if pre-screening stage 204 suggests the presence of an oxidizer, such as, without limitation, hydrogen peroxide, a more optimum matching of the bremsstrahlung spectrum to the principal Bragg peak position is facilitated by increasing the X-ray tube voltage potential at constant power, and decreasing the X-ray generation current, as the Bragg peak of hydrogen peroxide lies at higher momentum than that of water.

Also, if the local transmission of the container is high, i.e., if portions of the container are relatively transparent, then XDI screening stage 206 may be operated at a lower power without significant signal degradation as it scans this object region. Conversely, where the local transmission of the container is low, i.e., if portions of the container indicate relatively dense contents, then the power of XDI screening stage 206 may be increased to enhance inspection of the container.

As such, based on such potential threat object information, smart communication system 202 transmits adaptive information to XDI screening stage 206 (as shown by arrow 210). For example, and without limitation, smart communication system 202 regulates current and voltage values to XDI screening stage 206 to enhance its detection performance. Therefore, this type of information can be used to adapt "on the fly" the operating characteristics of XDI screening stage 206.

Therefore, smart communication system 202 is configured to determine potential threats at least partially as a function of the constraint data generated by pre-screening stage 204 and transmitted to smart communication system 202. Furthermore, smart communication system 202 is configured to transmit such constraint data to XDI screening system 206 is the form of operational control signals to regulate irradiation of the container and/or direct transmission of the constraint data to a controller for XDI screening system 206.

FIG. 4 is a flow chart of an exemplary method 300 of operating two-stage screening system 200 shown in FIGS. 2 and 3. Method 300 includes performing a security screen of a container, i.e., a container is irradiated 302 with a pre-screening stage X-ray device 204 (shown in FIGS. 2 and 3). Such irradiating 302 generates 304 constraint data associated with the contents of the container. The constraint data generated by pre-screening stage 204 is transmitted 306 to smart communication system 202 (shown in FIGS. 2 and 3), i.e., processing device 212 (shown in FIGS. 2 and 3). The container is irradiated 308 with XDI screening stage X-ray device 206 (shown in FIGS. 2 and 3) and XDI image data is obtained and transmitted to processing device 212. At least one image of the container is reconstructed 310 at least partially as a function of the constraint data within processing unit 212. Specifically, the constraint data is used to regulate operation of XDI screening stage 206 by determining potential threats at least partially as a function of the constraint data and regulating irradiation of the container as a function of the determined potential threats. Also, specifically, the constraint data is used to facilitate iterative reconstruction of the images through smart communication system 202 generating estimated XDI image data at least partially from the constraint data, XDI screening stage 206 generating actual image data from a scan of the container, and smart communication system 202 calculating differences between the estimated XDI image data and the actual image data.

As described for the exemplary embodiment herein, processing device 212 in smart communication system 202 executes the algorithms and instructions to enable operation of two-stage screening system 200. Alternatively, system 200 may include a distributed processing system that includes processing devices functionally similar to processing device 212 embedded in each of pre-screening stage 204, smart communication system 202, and XDI screening stage 206 such that at least a portion of the operations described above in the exemplary embodiment are executed in one or more of the predetermined processing devices. For example, and without limitation, mirroring image data from XDI screening stage 206 onto a four-dimensional (4D) object matrix and generating the $0^{th}$ order approximation of the contents in the container may be at least partially executed in the processing device embedded within XDI screening stage 206. Also, for example, and without limitation, improvements in the $0^{th}$ order approximation through the iterative XDI reconstruction as described above may be at least partially executed in the processing device embedded within XDI screening stage 206. Further, in alternative embodiments, any distribution of the processing features of processing device 212 throughout two-stage screening system 200 that enables operation of system 200 as described herein may be used.

The above described multi-stage security screening system with a smart communication system between the stages facilitates cost-effective enhanced integration of a pre-screener image and an X-ray diffraction imaging (XDI) scanner, thus enhancing overall performance of a security scanning system. Specifically, in contrast to many known security scanning systems, the multi-stage security screening system with a smart communication system as described herein facilitates exceeding mere transferring of only threat coordinates and the nature of a supposed threat via a simple communication stage to a subsequent XDI scanner. More specifically, the systems described herein collect potential threat information from a pre-screener stage and transmit such information to a "smart" communication stage prior to transmission to an XDI scanner stage. The "smart" communication stage as described herein executes tasks that include, in addition to transferring container coordinates and supposed nature of a potential threat, also constraining XDI images using pre-screener images to improve spatial resolution within the container and reducing noise, aiding aggregation of voxels belonging to the same object in the container under investigation, and adapting the operating parameters of the XDI scanner in real-time as a function of the potential threats. Therefore, threat detection is enhanced at a constant X-ray source flux, thereby maintaining a constant X-ray dose rate and power consumption. Also, intelligently using information through the "smart" communication stage to make a threat/no threat decision on the basis of both pre-screener information and XDI information to resolve alarms raised by the pre-screener facilitates decreasing the false alarm rate (FAR) regardless of the frequency or rate of detection.

A technical effect of the systems and methods described herein includes at least one of: (a) transferring container coordinates and supposed nature of a potential threat; (b) constraining XDI images using pre-screener images to improve spatial resolution within the container and reducing noise; (c) aggregating voxels belonging to the same object in the container under investigation; (d) adapting the operating parameters of the XDI scanner in real-time as a function of potential threats identified by a pre-screening stage; (e) enhancing detection performance through decreasing false alarm rates without increasing power consumption and X-ray dose rates; and (f) iteratively reconstruct scanning images using constraint data generated by a pre-screening stage, estimated XDI image data at least partially generated from the constraint data, actual image data generated by a scan performed by a screening stage, and calculated differences between the estimated XDI image data and the actual image data.

Exemplary embodiments of multi-stage security screening system with a smart communication system between the stages and methods of using the same are described above in detail. The methods and systems are not limited to the specific embodiments described herein, but rather, components of systems and/or steps of the methods may be utilized independently and separately from other components and/or steps described herein. For example, the methods may also be used in combination with other detection systems and methods, and are not limited to practice with only the detection systems and methods as described herein. Rather, the exemplary embodiment may be implemented and utilized in connection with many other multi-stage security screening system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-stage screening system for screening a container, said multi-stage screening system comprising:
   a pre-screening stage comprising a transmission X-ray device, said pre-screening stage configured to generate constraint data associated with the contents of the container;
   a screening stage comprising an X-ray diffraction imaging (XDI) device, said screening stage configured to generate image data associated with the contents of the container; and
   a communication system coupled to said pre-screening stage and said screening stage, said communication system configured to receive and transmit said constraint data and reconstruct at least one image of the container at least partially as a function of said constraint data and said image data, wherein said communication system is further configured to iteratively reconstruct the at least one image of the container using:
   estimated XDI image data at least partially generated from said constraint data;
   actual image data generated by a scan performed by said screening stage; and
   calculated differences between said estimated XDI image data and the actual image data.

2. The multi-stage screening system in accordance with claim 1, wherein said communication system is further configured to aggregate a plurality of voxels to at least partially define at least one object in the container.

3. The multi-stage screening system in accordance with claim 2, wherein said constraint data comprises said aggregated plurality of voxels, thereby constraining the at least one object with respect to at least one of object shape and coordinates of position within the container.

4. The multi-stage screening system in accordance with claim 1, wherein said communication system is further configured to determine potential threats at least partially as a function of said constraint data.

5. The multi-stage screening system in accordance with claim 4, wherein said communication system is further configured to regulate irradiation of the container by the screening stage at least partially as a function of the determined potential threats.

6. The multi-stage screening system in accordance with claim 4, wherein the determined potential threats are at least partially defined by constraint data comprising attenuation properties of the at least one object.

7. The multi-stage screening system in accordance with claim 6, wherein said communication system is further configured to regulate irradiation of the container by the screening stage at least partially as a function of the determined potential threats.

8. The multi-stage screening system in accordance with claim 1, wherein said constraint data comprises a transparency determination of the container as a result of a scan by said pre-screening stage.

9. A method of performing a security screen of a container, said method comprising:
   irradiating a container with a pre-screening stage X-ray device;
   generating constraint data associated with the contents of the container;
   transmitting the constraint data to a communication system;
   irradiating the container with a screening stage X-ray device; and
   iteratively reconstructing at least one image of the container at least partially as a function of the constraint data comprising:
   generating estimated XDI image data at least partially from the constraint data;
   generating actual image data from a scan of the container by the screening stage X-ray device; and calculating differences between the estimated XDI image data and the actual image data.

10. The method in accordance with claim 9, wherein irradiating a container with a pre-screening stage X-ray device comprises irradiating the container with a transmission X-ray device.

11. The method in accordance with claim 9, wherein irradiating the container with a screening stage X-ray device comprises irradiating the container with an X-ray diffraction imaging (XDI) device.

12. The method in accordance with claim 9 further comprising aggregating a plurality of voxels to at least partially define at least one object in the container.

13. The method in accordance with claim 12 further comprising constraining the at least one object with respect to at least one of shape and coordinates of position within the container.

14. The method in accordance with claim 9, wherein irradiating the container with the screening stage X-ray device comprises:
    determining potential threats at least partially as a function of the constraint data; and
    regulating irradiation of the container as a function of the determined potential threats.

15. The method in accordance with claim 14, wherein determining potential threats at least partially as a function of the constraint data comprises determining attenuation properties of the at least one object as a function of irradiating the container with the pre-screening stage X-ray device.

16. The method in accordance with claim 9, wherein generating constraint data associated with the contents of the container comprises generating a transparency determination of the container as a function of irradiating the container with the pre-screening stage X-ray device.

* * * * *